United States Patent [19]

Hirata

[11] Patent Number: 4,563,709
[45] Date of Patent: Jan. 7, 1986

[54] ROTARY RECORD HAVING A SPIRAL TRACK WITH A VIDEO SIGNAL AND TWO AUDIO SIGNALS RECORDED THEREON

[75] Inventor: Atsumi Hirata, Fujisawa, Japan

[73] Assignee: Victor Company of Japan, Ltd., Yokohama, Japan

[21] Appl. No.: 729,088

[22] Filed: May 2, 1985

Related U.S. Application Data

[63] Continuation of Ser. No. 523,668, Aug. 15, 1983, abandoned.

[30] Foreign Application Priority Data

May 31, 1983 [JP] Japan .................................. 58-96767

[51] Int. Cl.$^4$ .......................... H04N 5/76; H04N 5/91; H04N 5/78
[52] U.S. Cl. ..................................... 358;342; 358/341; 360/10.1
[58] Field of Search ............... 358/310, 330, 341, 342, 358/343, 145

[56] References Cited

U.S. PATENT DOCUMENTS

| | | | |
|---|---|---|---|
| 3,909,512 | 9/1975 | Omori et al. | 358/343 |
| 3,924,062 | 12/1975 | Broadbent | 358/343 |
| 4,142,209 | 2/1979 | Hedlund et al. | 358/342 |
| 4,208,671 | 6/1980 | Ozawa et al. | 358/330 X |
| 4,227,213 | 10/1980 | Isobe | 358/343 |
| 4,360,824 | 11/1982 | Takuhashi et al. | 358/323 |
| 4,475,132 | 10/1984 | Rodesch | 358/342 |

FOREIGN PATENT DOCUMENTS

| | | |
|---|---|---|
| 3226389 | of 0000 | Fed. Rep. of Germany . |
| 3238041 | of 0000 | Fed. Rep. of Germany . |
| 2107507 | of 0000 | United Kingdom . |
| 2099202 | 12/1982 | United Kingdom ................ 358/342 |
| 2111292 | 6/1983 | United Kingdom . |

OTHER PUBLICATIONS

"Twelve Sound Channels During the Vert. Sync Interval of the TV Signal", Gassmann; IEEE Trans. Broadcast & TV Receivers, vol. BTR-16, No. 4, Nov. 1970.

Primary Examiner—Aristotelis M. Psitos
Attorney, Agent, or Firm—Louis Bernat

[57] ABSTRACT

A rotary recording medium is recorded with an information signal including a video signal on a spiral track formed thereon in terms of a plurality of fields of the video signal in one track turn of the spiral track. The rotary recording medium is time-sequentially recorded with information signals related to two or more different programs so that each information signal is successively recorded in terms of a period less than or equal to the above plurality of fields before being switched to an information signal related to a different program which is recorded immediately thereafter. A reproducing apparatus comprises a reproducing element which scans over the spiral track to reproduce the recorded information. This reproducing element is forcibly kicked with an interval of a predetermined field period when reproducing an information signal related to a desired program which is recorded with an interval of this predetermined field period under the normal reproduction mode such that the reproducing element reproduces each field of the information signal related to the desired program. The forced kicking of the reproducing element from one track to another track is suspended at one kicking position where the reproducing element should originally be kicked when switching the program which is to be reproduced.

2 Claims, 22 Drawing Figures

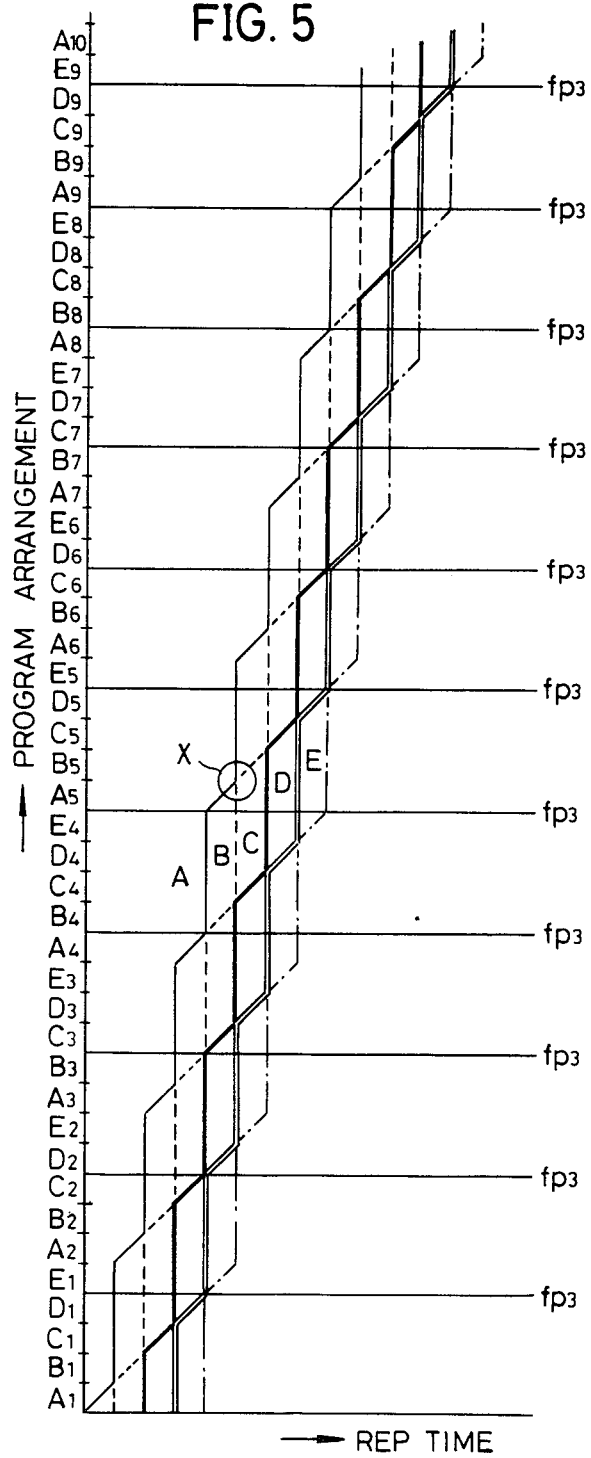

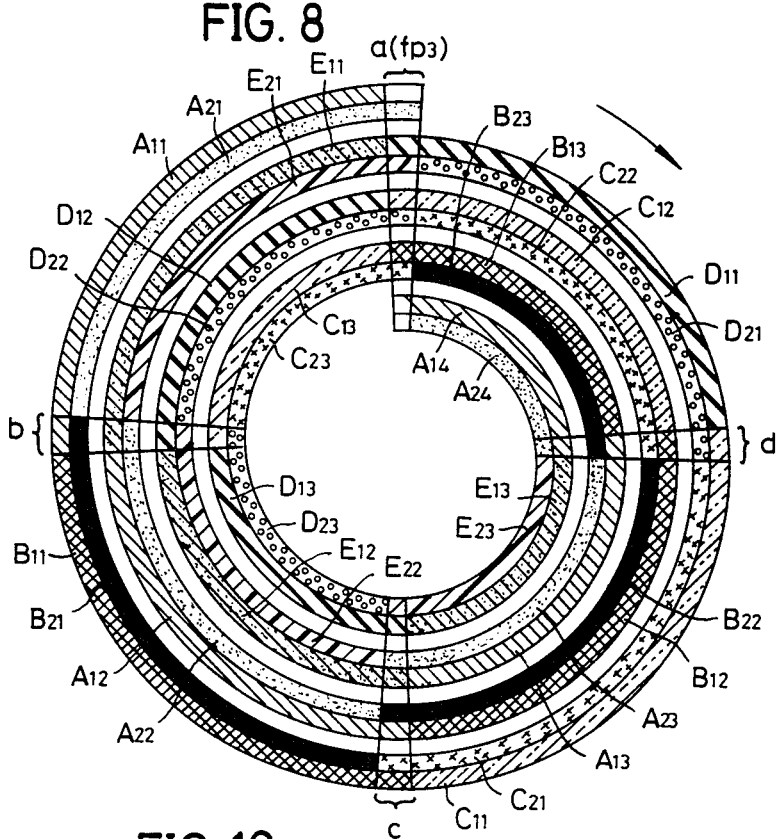
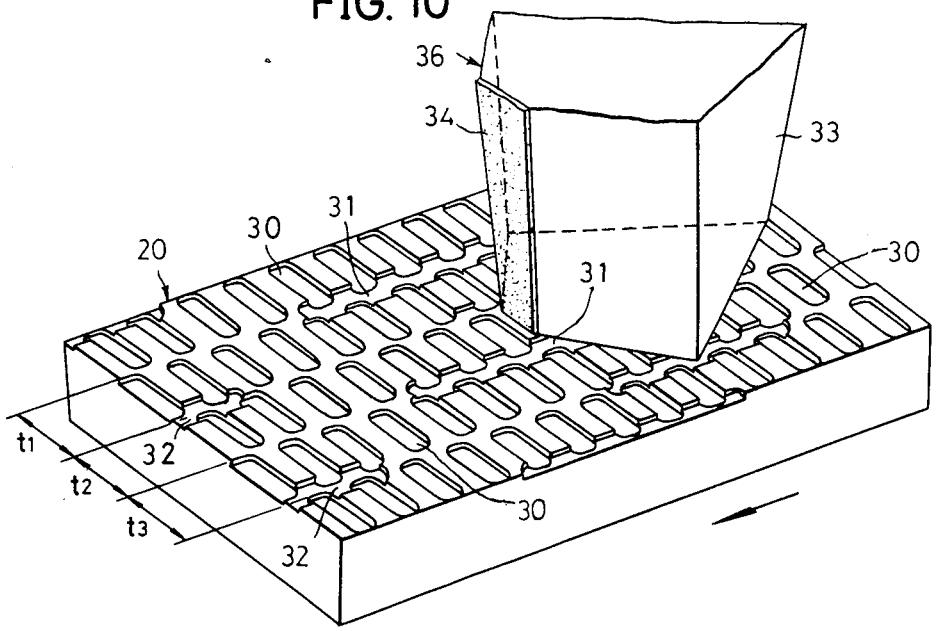

ROTARY RECORD HAVING A SPIRAL TRACK WITH A VIDEO SIGNAL AND TWO AUDIO SIGNALS RECORDED THEREON

This is a continuation of U.S. application Ser. No. 523,668, filed Aug. 15, 1983, now abandoned and entitled ROTARY RECORD HAVING A SPIRAL TRACK WITH A VIDEO SIGNAL AND TWO AUDIO SIGNALS RECORDED THEREON.

BACKGROUND OF THE INVENTION

The present invention generally relates to rotary recording mediums and reproducing apparatuses therefor, and more particularly to a rotary recording medium on which information signals including a video signal and related to at least two or more programs, are each switched in terms of a plurality of field periods corresponding to one track turn or less and time-sequentially recorded so as to enable instantaneous switching of programs to be reproduced, and a reproducing apparatus therefor.

A rotary recording medium (hereinafter simply referred to as a disc) on which an information signal including a video signal, may be used in various applications. The disc may be used in an application where it is required to arbitrarily select a program from among a plurality of programs and reproduce the selected program during a reproduction. For example, such a requirement exists when the disc is used in a simulation game for playing tennis or baseball, for instance. When playing a tennis simulation game, the traveling direction of a serve and the traveling direction of a return may assume various directions. Similarly, when playing a baseball simulation game, the traveling directions of a pitch and the traveling directions of a hit may assume various directions. Thus, when playing such games, there were cases where one possible process or result had to be quickly selected and reproduced from among a plurality of possibilities. Conventionally, in such cases, video information programs corresponding to a plurality of processes or results from which the selection may be made, were independently recorded on a disc. An arbitrary picture information was selected and reproduced from the disc by carrying out a random access search. However, it took a minimum of approximately one second to carry out such a random access. When playing a simulation game, this time of approximately one second was too long, and made the game unexciting and uninteresting.

SUMMARY OF THE INVENTION

Accordingly, it is a general object of the present invention to provide a novel and useful rotary recording medium and a reproducing apparatus therefor, according to which the above described problems have been eliminated.

Another and more specific object of the present invention is to provide a rotary recording medium on which information signals including a video signal and related to at least two or more programs, are each switched in terms of a plurality of field periods corresponding to one track turn or less and time-sequentially recorded, and a reproducing apparatus therefor. According to the reproducing apparatus according to the present invention, it is possible to instantaneously switch programs to be reproduced between different programs. Thus, when the present invention is applied to a simulation game, the game can be played in real time without the player losing interest.

Still another object of the present invention is to provide a rotary recording medium on which information signals including a video signal and a plurality of channels of audio signals and related to two or more programs, are each switched in terms of a plurality of field periods corresponding to one track turn or less and time-sequentially recorded, and the plurality of channels of audio signals within the information signals related to the different programs in the vicinity of program-connecting recording positions where the different programs switch over and connect are recorded so that the program-connecting recording position of the audio signal related to one channel and the program-connecting recording position of the audio signal related to another channel are mutually in non-alignment along the track scanning direction, and a reproducing apparatus therefor. The reproducing apparatus comprises means for switching a demodulated output of the audio signal from the audio signal related to one channel to the audio signal related to the different channel when forcibly kicking a reproducing element from one track to another track in the vicinity of the program-connecting recording position where the different programs switch over and connect. According to the present invention, when the plurality of channels of audio signals are all of the same monaural audio signal or stereo audio signals having virtually no difference in the information between the channels, the video signal related to the same program can be reproduced continuously. Furthermore, the audio information related to the same program can be reproduced constantly and continuously with a satisfactory signal-to-noise ratio, without noise being mixed therein when the reproducing element is kicked from one track to another track.

Another object of the present invention is to provide a reproducing apparatus in which, based on program numbers assigned to each of the two or more different programs recorded on the rotary recording medium, (N−M) pulses are produced which number of pulses is a difference between a program number M of a program which is being reproduced and a program number N of a desired program which is to be reproduced by switching the program, and reproduction is carried out by forcibly kicking the reproducing element along a predetermined direction by use of the produced pulses according to whether the value of the difference between the program numbers assumes a positive or negative value. According to the reproducing apparatus of the present invention, it is possible to instantaneously switch the program to be reproduced from one program to another program and reproduce that other program, by a simple method.

Other objects and further features of the present invention will be apparent from the following detailed description when read in conjunction with the accompanying drawings.

BRIEF DESCRIPTION OF THE DRAWINGS

FIG. 5 schematically shows a program recording arrangement and reproducing time of a first embodiment of a disc according to the present invention;

FIG. 8 schematically shows an embodiment of a track pattern on a disc according to the present invention solely with respect to audio signals;

FIG. 10 is a perspective view showing a part of a disc and a tip end part of a reproducing stylus in an enlarged scale;

DETAILED DESCRIPTION

Figure 1:
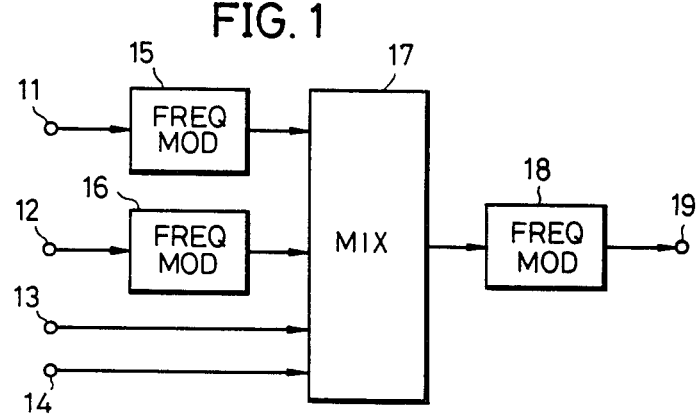
FIG. 1 is a systematic block diagram showing an embodiment of a recording system for a disc according to the present invention.

In FIG. 1, audio signals of first and second channels which are reproduced by a recording and reproducing apparatus, for example, are applied to respective input terminals 11 and 12. The 2-channel audio signals applied to the input terminals 11 and 12, are audio signals related to the same program source. The 2-channel audio signals may be the same monaural signal, or may be stereo audio signals having virtually no difference between the information in the right and left channels. As will be described hereinafter, the 2-channel audio signals are divided and recorded in terms of field periods corresponding to four or less fields, according to a scanning locus of a reproducing stylus during a normal reproduction mode. Hence, for each of the above field periods, audio signals related to different program sources are successively switched and applied to the input terminals 11 and 12.

The first-channel audio signal applied to the input terminal 11 is supplied to a frequency modulator 15 wherein a carrier having a predetermined frequency of 3.43 MHz, for example, is frequency-modulated, and produced as a first-channel frequency-modulated (FM) audio signal. At the same time, the second-channel audio signal applied to the input terminal 12 is supplied to a frequency modulator 16 wherein a carrier having a frequency of 3.73 MHz, for example, is frequency-modulated, and produced as a second-channel FM audio signal. These first-channel and second-channel FM audio signals are supplied to a mixing circuit 17 wherein these FM audio signals are multiplexed with a video signal obtained through an input terminal 13 and an address signal obtained through an input terminal 14. The video signal applied to the input terminal 13 is a signal in which a carrier chrominance signal which is frequency-converted into a low band so that a chrominance subcarrier frequency becomes equal to 2.56 MHz is band-share multiplexed into a high frequency range of a luminance signal which is limited of its band so that an upper limit frequency is in a range of approximately 3.1 MHz, for example, in order to prevent the band of the video signal from overlapping the band of the first-channel and second-channel FM audio signals. In addition, the address signal which will be described hereinafter is applied to the input terminal 14 in correspondence with a specific interval within a vertical blanking period of the video signal applied to the input terminal 13, and supplied to the mixing circuit 17. Accordingly, a frequency-division multiplexed signal having a frequency spectrum shown in FIG. 2, is obtained from the mixing circuit 17.

Figure 2:
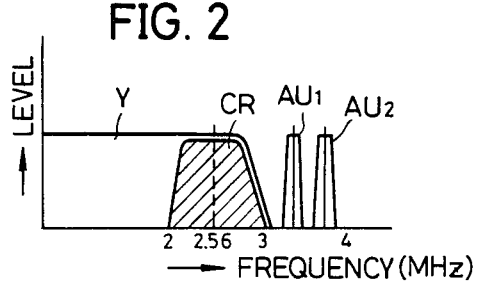
FIG. 2 is a graph showing a frequency spectrum of an output signal of an essential part of the block system shown in FIG. 1.
Figure 3:
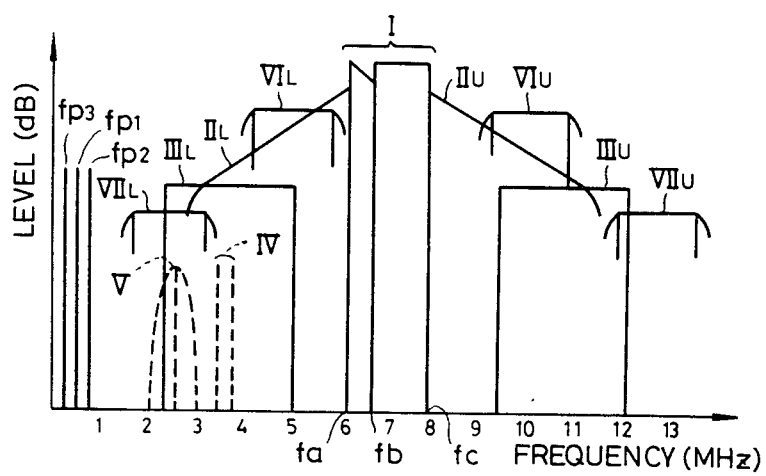
FIG. 3 is a graph showing a frequency spectrum of an output signal of the block system shown in FIG. 1.

In FIG. 2, the band-limited luminance signal is represented by Y, the carrier chrominance signal which is frequency-converted into the low band (low-band-converted carrier chrominance signal) by CR, and the first-channel and second-channel FM audio signals $f_{A1}$ and $f_{A2}$ by AU$_1$ and AU$_2$, respectively. The frequency-division multiplexed signal having the frequency spectrum shown in FIG. 2 is supplied to a frequency modulator 18, and formed into an FM signal having a frequency spectrum shown in FIG. 3. In FIG. 3, a carrier frequency deviation band of 2.3 MHz of the frequency-modulated luminance signal is represented by I, a frequency of 6.1 MHz corresponding to a sync tip by fa, a frequency of 6.6 MHz corresponding to a pedestal level by fb, and a frequency of 7.9 Hz corresponding to a white peak by fc. In addition, the lower and upper sidebands of the frequency-modulated luminance signal are represented by II$_L$ and II$_U$, and the lower and upper sidebands of a signal which is obtained by further frequency-modulating the FM audio signals $f_{A1}$ and $f_{A2}$ indicated by AU$_1$ and AU$_2$ in FIG. 2 by III$_L$ and III$_U$. The carriers of the 2-channel FM audio signals $f_{A1}$ and $f_{A2}$ having the frequencies of 3.43 MHz and 3.73 MHz, respectively, are indicated by IV.

Further, in FIG. 3, a frequency band of the low-band-converted carrier chrominance signal is represented by V, which is the same as the frequency band indicated by CR in FIG. 2. In addition, first sidebands obtained when the low-band-converted carrier chrominance signal is frequency-modulated are represented by $VI_L$ and $VI_U$, and second sidebands obtained when the low-band-converted carrier chrominance signal is frequency-modulated by $VII_L$ and $VII_U$.

The FM audio signal having the frequency spectrum described heretofore, is obtained through an output terminal 19 shown in FIG. 1, as a main information signal.

For example, the main information signal is recorded onto a disc according to a method described in detail in a U.S. Pat. No. 4,331,976 in which the assignee is the same as the assignee of the present application. That is, for example, the main information signal is applied to a light modulator (not shown) wherein a laser light is modulated and converted into a modulated light beam. The modulated light beam is condensed on a original disc which is coated with a photosensitive agent and undergoing synchronous rotation. A main track constituted by rows of intermittent pits are formed according to a repetition frequency of the main information signal, by a known developing process. Accordingly, the video signal and the 2-channel audio signals are simultaneously recorded on the same main track. Reference signals fp1 and fp2 for tracking control are applied to an independent light modulator (not shown) wherein a laser light is similarly modulated. The modulated light beam from this independent light modulator is used to form subtracks constituted by rows of intermittent pits, simultaneously with the forming of the main track. A disc is duplicated from such an original disc, by a known disc pressing process.

Figure 4:
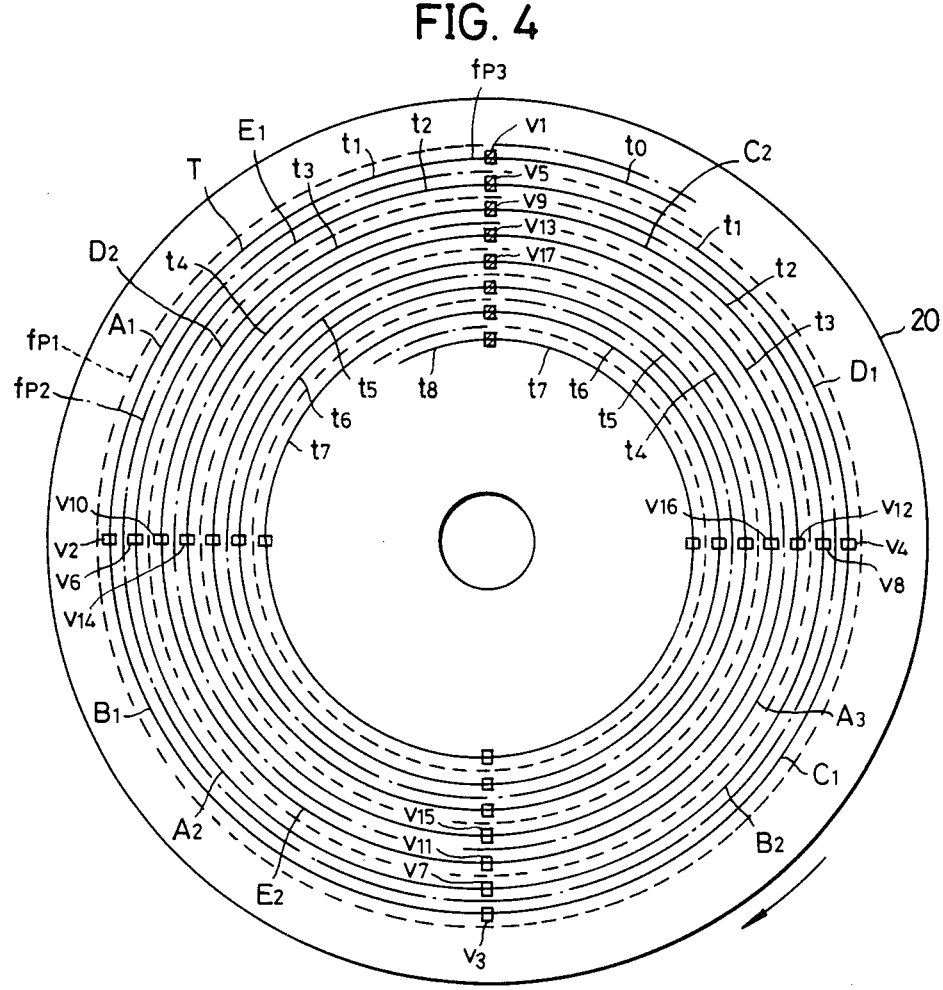
FIG. 4 shows an example of a track pattern on a disc.

A disc which is recorded and formed in this manner, has a track pattern shown in FIG. 4. The video and audio signals are recorded on a spiral track T of a disc 20, so that two frames, that is, four fields of the video signal are recorded for one track turn. In FIG. 4, a track for the reference signal fp1 is indicated by a broken line, and a track of the reference signal fp2 is indicated by a one-dot chain line. Positions where a vertical synchronizing signal is recorded in each of the fields, are indicated by V1, V2, V3, ... In addition, track parts of the spiral track T which correspond to one revolution of the disc, are indicated by tracks t1, t2, t3, ... A third reference signal fp3 is recorded at starting end positions of each of the tracks t1, t2, t3, ..., that is, at positions V1, V5, V9, ... where the sides on which the reference signals fp1 and fp2 are recorded with respect to the tracks t1, t2 t3, ... change over. Four fields of the video signal are recorded on the track t1.

Pits having different lengths according to the wavelengths of the output main information signal obtained through the output terminal 19, are formed intermittently along the spiral track T, and no guide groove is formed for guiding the reproducing stylus. The disc 20 has an electrode function, so that variations in the electrostatic capacitance between an electrode of the reproducing stylus which will be described hereinafter and the disc can be detected. Further, the address signal used when carrying out a random access, is multiplexed with the video signal in a specific interval within the vertical blanking period.

An embodiment of a disc according to the present invention is a disc of the type previously proposed and described heretofore, on which main information signals related to two or more different programs are each switched in terms of a plurality of field periods corresponding to one track turn or in terms of a smaller field period and time-sequentially recorded, and the 2-channel audio signals in the vicinity of program-connecting recording positions where the different programs switch over and connect are recorded so that the program-connecting recording position of the audio signal related to one channel and the program-connecting recording position of the audio signal related to the other channel are mutually in non-alignment along the track scanning direction.

First, description will be given with respect to embodiments of program recording arrangements and reproducing times, for a disc having four fields in one track turn. FIG. 5 schematically shows a program recording arrangement and reproducing time of a first embodiment of a disc according to the present invention. In FIG. 5, reference characters A1, B1, C1, D1, E1, A2, ..., A10 indicated along the vertical axis each represent a recording interval of one field for five programs represented by alphabets A through E. That is, the same alphabet represents the same program, and subscripts thereof represent sequence of the fields. In addition, the inner peripheral direction of the disc corresponds to the upwardly direction along the vertical axis in FIG. 5. Accordingly, in the track pattern shown in FIG. 4, for example, the information signal A1 corresponding to the first field of the first program A is recorded between the recording positions V1 and V2 of the vertical synchronizing signal on the track t1. The information signal B1 corresponding to the first field of the second program B is recorded between the recording positions V2 and V3 of the vertical synchronizing signal on the track t1. Similarly, the information signal C1 corresponding to the first field of the third program C is recorded between the recording positions V3 and V4 of the vertical synchronizing signal, the information signal D1 corresponding to the first field of the fourth program D is recorded between the recording positions V4 and V5 of the vertical synchronizing signal, the information signal E1 corresponding to the first field of the fifth program E is recorded between the recording positions V5 and V6 of the vertical synchronizing signal, and the information signal A2 corresponding to the second field of the first program A is recorded between the recording positions V6 and V7 of the vertical synchronizing signal. In the first embodiment of the disc shown in FIG. 5, the information signals each corresponding to one field of one of the five programs A through E are switched in terms of one field and successively recorded time-sequentially on the disc in this manner.

Therefore, the information signals each corresponding to one field of one of the four different programs among the five programs A through E, are recorded time-sequentially on one track turn of the first embodiment of the disc shown in FIG. 5.

In FIG. 5, as in FIGS. 6 and 7 which will be described hereinafter, the recording positions of the third reference signal fp3 are indicated by fp3. This reference signal fp3 is recorded within the recording part of the main track corresponding to the vertical blanking period, for a period in the range of of 3H (H indicates one horizontal scanning period), for example.

When the disc contains a baseball simulation game, for example, the five programs A through E relate to five kinds of video and audio information concerning the type of pitch and the course of the pitch.

Figure 6:
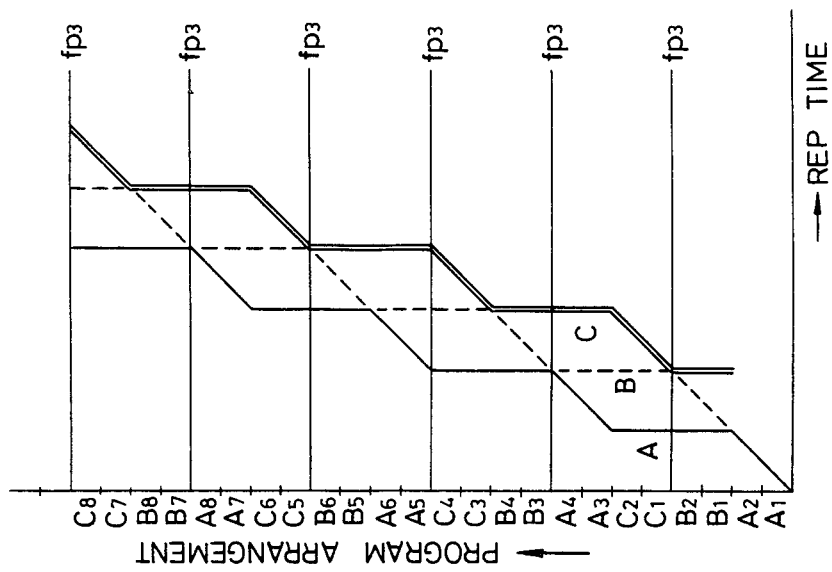
FIG. 6 schematically shows a program recording arrangement and reproducing time of a second embodiment of a disc according to the present invention.

FIG. 6 schematically shows a program recording arrangement and reproducing time of a second embodiment of a disc according to the present invention. In the present embodiment, three programs A through C are successively recorded in terms of two fields, so that two fields of one of the three programs and two fields of another of the three programs occupy each track turn. That is, the first field A1 and the second field A2 of the program A are first recorded, the first field B1 and the second field B2 of the program B are recorded thereafter, the first field C1 and the second field C2 of the program C are recorded thereafter, and the third field A3 and the fourth field A4 of the program A are recorded thereafter.

Figure 7:
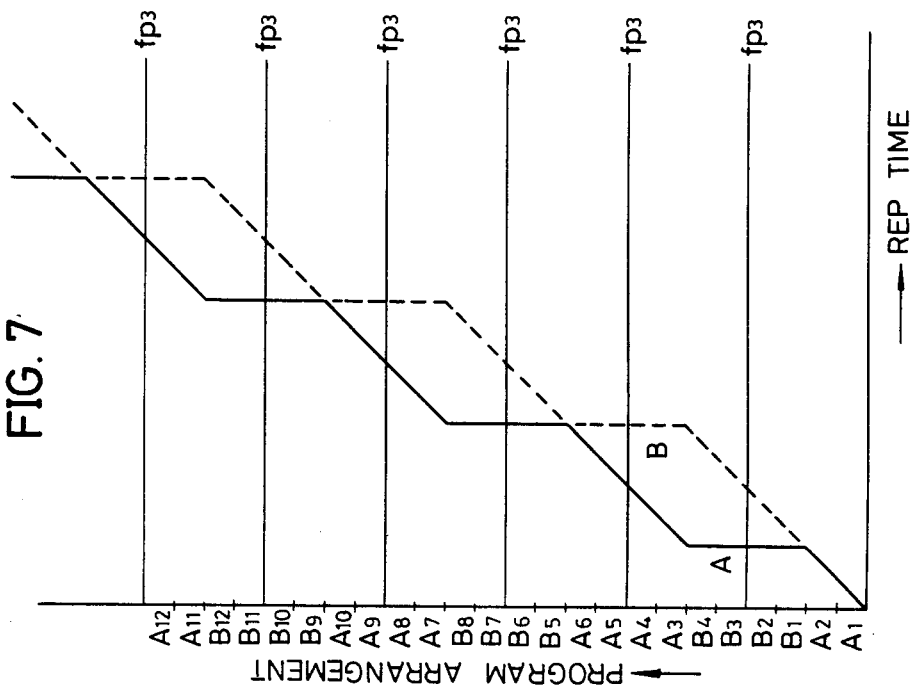
FIG. 7 schematically shows a program recording arrangement and reproducing time of a third embodiment of a disc according to the present invention.

FIG. 7 schematically shows a program recording arrangement and reproducing time of a third embodiment of a disc according to the present invention. As the vertical axis in FIG. 7 clearly indicates, two programs A and B are alternately recorded in terms of four fields, according to to the present embodiment.

Next, description will be given with respect to the recording of the audio signals onto the disc according to the present invention. FIG. 8 schematically shows a track pattern on an embodiment of a disc according to the present invention, solely with respect to the audio signals. In FIG. 8, intervals a, b, c, and d indicate recording parts corresponding to the vertical blanking periods. The reference signal fp3 is recorded within the recording part a. In the present embodiment, each of the information signals of the five programs A through E are successively switched and recorded in terms of one field as in the embodiment shown in FIG. 5.

In FIG. 8, a recording interval of the first-channel audio signal related to the first program A is indicated by $A_{11}$, and a recording interval of the second-channel audio signal related to the first program A is indicated by $A_{21}$. In addition, a recording interval of the first-channel audio signal related to the second program B is indicated by $B_{11}$, and a recording interval of the second-channel audio signal related to the second program B is indicated by $B_{21}$. Similarly, recording intervals of the audio signals related to the third, fourth, and fifth programs are respectively indicated by C D, and E, where the tens' digit in the subscripts of these alphabets indicating the recording intervals indicate the channel of the audio signal and the ones' digit in the subscripts indicate the sequence of the field of the audio signal. Accordingly, the 2-channel audio signals related to each program are divided in terms of one field and recorded so that one field of each program is recorded with an interval of four fields, that is, so that one field of one program is recorded in every fifth field. It will be assumed that the 2-channel audio signals are the same monaural audio signal. However, the 2-channel audio signals may be stereo audio signals having virtually no difference in the information between the channels.

Furthermore, because the 2-channel audio signals are recorded together with the video signal on the same track, the 2-channel audio signals related to the same programs and the same sequence of field, that is, related to the programs represented by the same alphabet with a subscript having the same ones' digit, are recorded on the same one track in FIG. 8. As may be seen from FIG. 8, four different program-connecting recording positions where the different programs switch over and connect exist in each track turn from the recording part a corresponding to the vertical blanking period where the reference signal fp3 is recorded.

According to the present embodiment, the 2-channel audio signals within the information signals related to the different programs in the vicinity of the program-connecting recording positions where the different programs switch over and connect are recorded so that the program-connecting recording position of the audio signal related to one channel and the program-connecting recording position of the audio signal related to the other channel are mutually in non-alignment along the track scanning direction. That is, the 2-channel audio signals are recorded in non-alignment along the scanning direction, so that a terminal position where the recording of the first-channel audio signal related to one program terminates on one track is in the vicinity of a terminal part of the vertical blanking period, while a terminal position where the recording of the second-channel audio signal related to the same program terminates on that track is in the vicinity of a beginning part of the same vertical blanking period. Accordingly, a starting position where the recording of the first-channel audio signal related to the subsequent program starts is in the vicinity of the terminal part of the same vertical blanking period, while a starting position where the recording of the second-channel audio signal starts is in the vicinity of the beginning part of that same vertical blanking period, and the program-connecting recording positions of the audio signals are in non-alignment along the scanning direction.

The distance corresponding to a relative difference between terminal (or starting) positions where the recording of the 2-channel audio signals terminate (or starts) along the scanning direction, is selected in a range of $\pm 20H$ to $\pm 30H$, for example.

Next, description will be given with respect to the recording of the address signal on the disc according to the present invention. For example, the address signal applied to the input terminal 14 shown in FIG. 1 comprises four kinds of address signals each constituted by 29 bits. Among these four kinds of address signals, a chapter address signal, a time address signal, and a track number address signal (page address signal) are each multiplexed and recorded within three vertical blanking periods among four vertical blanking periods in one track turn, excluding the vertical blanking period in which the reference signal fp3 is multiplexed and recorded. In addition, a kick address signal is multiplexed and recorded within the vertical blanking period in which the reference signal fp3 is multiplexed and recorded. The chapter address signal is an address signal which indicates a signal recording position on the disc in terms of a sequence of the recorded programs, and the time address signal is an address signal which indicates a signal recording position in terms of reproducing time. The track number address signal is an address signal which indicates a recording position in terms of the number of tracks when one track is assumed to be one track turn counted from the recording position of the reference signal fp3.

The kick address signal is described in detail in a U.S. patent application Ser. No. 433,872 in which the assignee is the same as the assignee of the present application, for example. The kick address signal is an address signal comprising a kick instruction code which instructs the existence of a kick at the four vertical blanking periods in one track turn, a kicking direction instructing code which instructs the kicking direction at four vertical blanking periods in one track turn, and the like. According to the present embodiment, a 4-bit track number code within this kick address signal is changed and used as a code for indicating a program number of the program which is recorded in an interval corresponding to approximately one field between the vertical blanking period in which the reference signal fp3 is recorded and a subsequent vertical blanking period. The program number assumes a value which is assigned in the sequence with which the two or more different programs are recorded on the disc. For example, if the disc is recorded with five programs A, B, C, D, and E as indicated on the vertical axis in FIG. 5 and the programs are switched for every field and recorded in a sequence A→B→C→D→E→A→ . . . , a value "0" is assigned to the program A, a value "1" to the program B, a value "2" to the program C, a value "3" to the program D, and a value "4" to the program E.

When the video signal to be recorded in of the NTSC system, the four kinds of address signals are arranged within 1H period of one of horizontal scanning line numbers 17 (or 280), 18 (or 281), and 20 (or 283). In addition, the reproducing apparatus is designed so that the kicking position of the reproducing stylus which will be described hereinafter is within the vertical blanking period in the vicinity of the horizontal scanning line number 11 (or 274). Thus, the kick is carried out within the vertical blanking period immediately after the vertical synchronizing signal and the reference signal fp3 are reproduced, and immediately preceding the recorded positions of the address signals.

The number of vertical blanking periods in which the kick address signal is recorded, may be two to four in one track turn.

Figure 9:
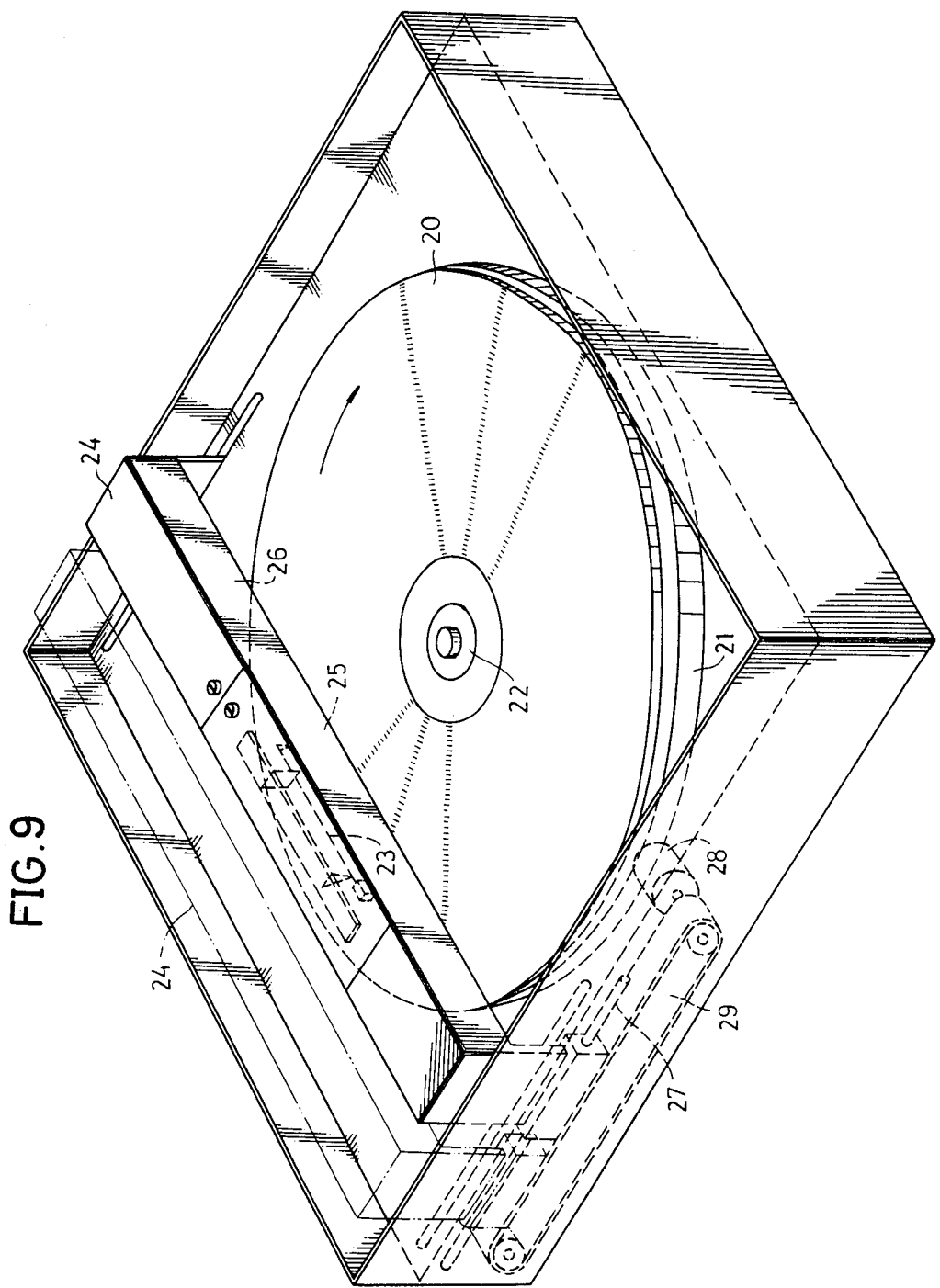
FIG. 9 is a perspective view showing an example of a reproducing apparatus.

Next, description will be given with respect to a reproducing apparatus according to the present invention. FIG. 9 shows the general appearance of a reproducing apparatus according to the present invention. The disc 20 described before on which two or more different programs are switched and recorded in terms of a predetermined field period, is placed onto a turntable 21. The disc 20 on the turntable 21 is clamped by a clamper 22, and rotated unitarily with the turntable 21 so as to undergo synchronous rotation at a speed of 900 rpm, for example.

A signal pickup device 23 which is used as a reproducing transducer, is mounted onto a semi-coaxial cavity resonator 25 provided in a carriage 24, and is connected to a central conductor (not shown) of the resonator 25. The central conductor is electro-magnetically coupled to a high frequency oscillator 26. This design of the reproducing apparatus is known. The carriage 24 is guided by a pair of guide bars 27 (only one shown), and is moved linearly towards the inner periphery of the turntable 21 from the outer periphery thereof by a belt 29 which is driven by a motor 28 during a normal reproduction mode in the forward direction, in synchronism with the rotation of the turntable 21. Accordingly, the reproducing stylus of the signal pickup device 23 moves linearly along the radial direction of the disc 20 which is rotating, and relatively scans over the spiral track.

Figure 11:
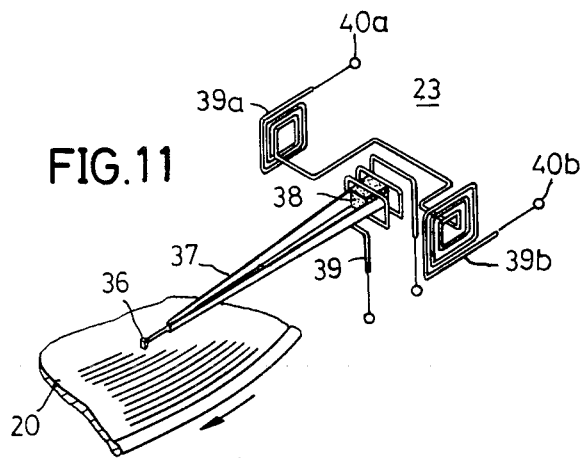
FIG. 11 is a disassembled perspective view showing an example of a reproducing transducer in the reproducing apparatus shown in FIG. 9.

An example of the signal pickup device 23 shown in FIG. 9, is shown in FIG. 11. A reproducing stylus 36 is fixed to a tip end of a cantilever 37, and a permanent magnet 38 is fixed to a rear end of the cantilever 37. The cantilever 37 is supported by a resilient support member (not shown) made of rubber and the like, in the vicinity of the rear end thereof. When a current is applied to tracking coils 39a and 39b through terminals 40a and 40b, the cantilever 37 is displaced in relation to a magnetic field generated by the permanent magnet 38, and tracking control is accordingly carried out. Further, a stylus pressure applying coil 39 is provided in the vicinity of the permanent magnet 38, separated from the permanent magnet 38.

The tip end of the reproducing stylus 36 has a shape shown in FIG. 10. The reproducing stylus 36 is constituted by a stylus structure 33 having a disc tracing surface, and an electrode 34 fixed to the rear surface of the stylus structure 33. A metal ribbon 44 is connected to the electrode 34 as shown in FIG. 11. As the disc 20 rotates in the direction of an arrow in FIG. 10 and the reproducing stylus 36 scans over the tracks t1, t2, t3, . . . , the main information signal which is recorded by the formation of pits 30, the reference signal fp1 which is recorded by the formation of pits 31, and the reference signal fp2 which is recorded by the formation of pits 32 are reproduced from the disc 20 as variations in the electrostatic capacitance between the disc surface and the electrode 34 of the reproducing stylus 36.

Figure 12:
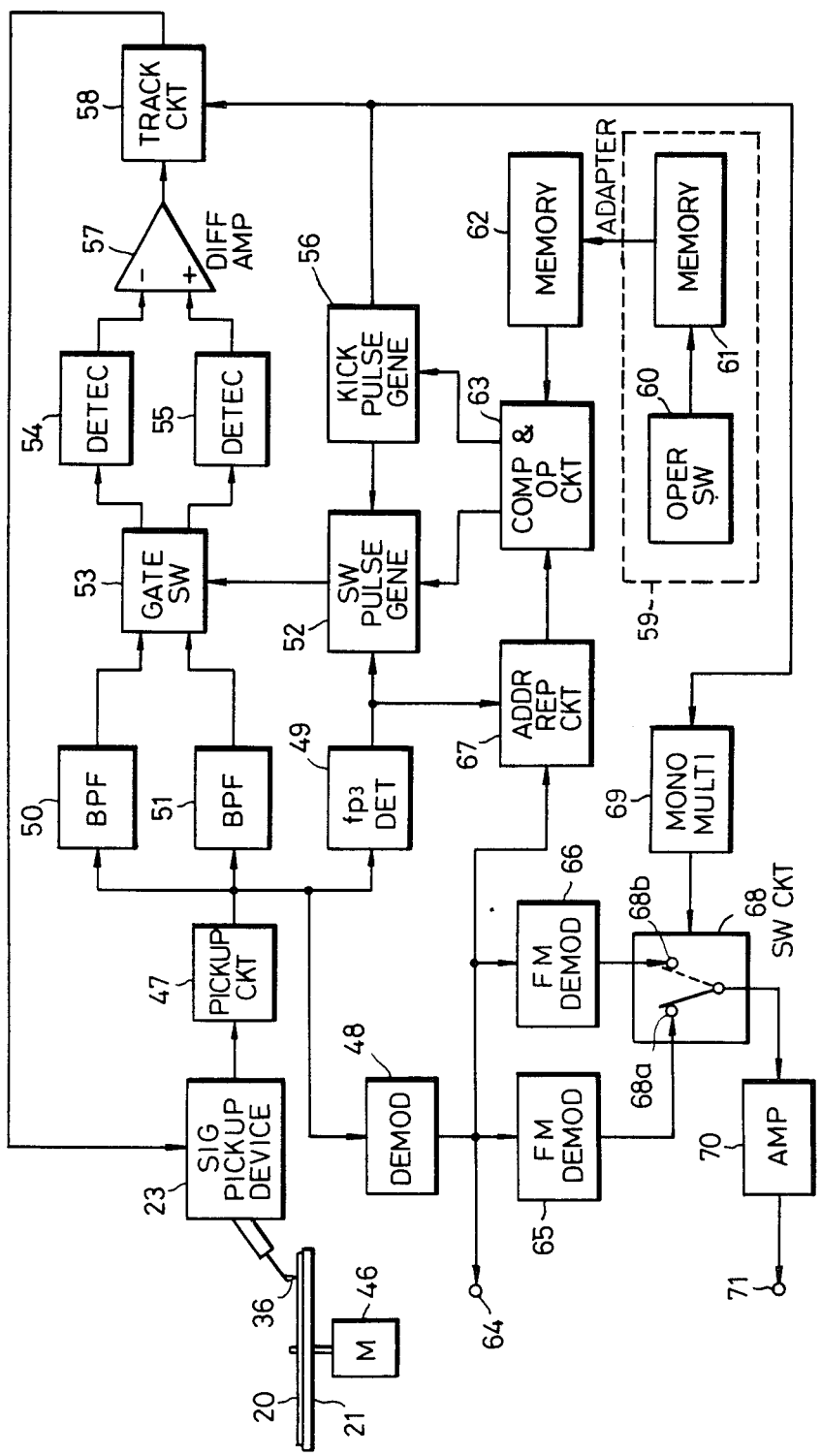
FIG. 12 is a systematic block diagram showing an embodiment of a reproducing apparatus according to the present invention.

The recorded signals are reproduced from the disc 20 by an embodiment of a reproducing apparatus according to the present invention shown in FIG. 12. In FIG. 12, the disc 20 on the turntable 21 is rotated by a motor 46 to undergo synchronous rotation at a speed of 900 rpm, for example. As described before, the electrostatic capacitance between the disc surface and the electrode 34 of the reproducing stylus 36 varies according to the rows of intermittent pits formed on the disc, and the resonance frequency of a resonator circuit (resonator 25 described previously) within a pickup circuit 47 is varied according to this variation in the electrostatic capacitance. In addition to this resonator circuit, the pickup circuit 47 comprises a high frequency oscillator (the oscillator 26 described previously) for applying an external signal having a constant frequency of approximately 1 GHz, for example, to the resonator circuit, an amplitude detecting circuit, and a preamplifying circuit. Because the amplitude of the signal having the constant frequency which is obtained from the resonator circuit varies according to the variation in the electrostatic capacitance, that is, according to the variation in the resonance frequency of the resonator circuit, the amplitude detecting circuit is provided to detect this variation in the amplitude. The preamplifying circuit amplifies the amplitude-detected signal from the amplitude detecting circuit.

A high frequency reproduced signal obtained from the pickup circuit 47, is supplied to a demodulating circuit 48 which will be described hereinafter wherein the reproduced signal is frequency-demodulated and the main information signal (the video signal and the FM audio signals in this case) is obtained. On the other hand, the reproduced signal from the pickup circuit 47 is also supplied to an fp3 detector 49, and bandpass filters 50 and 51.

The fp3 detector 49 frequency-selects the reference signal fp3 within the reproduced signal, and applies an fp3 detection signal which is in phase with the reference signal fp3 to a switching pulse generator 52. In addition, the bandpass filter 50 frequency-selects the reference signal fp1 within the reproduced signal, and applies the reference signal fp1 to one input terminal of a gate switching circuit 53. On the other hand, the bandpass filter 51 frequency-selects the reference signal fp2 within the reproduced signal, and applies the reference signal fp2 to the other input terminal of the gate switching circuit 53. The gate switching circuit 53 is switched according to the switching pulse from the switching pulse generator 52. For example, outputs of the bandpass filters 50 and 51 are independently connected to inputs of detectors 54 and 55 during the high level period of the switching pulse, and the outputs of the bandpass filters 50 and 51 are independently connected to the inputs of the detectors 55 and 54 during a low level period of the switching pulse.

The polarity and period of the switching pulse generated by the switching pulse generator 52 and the polarity and period of a kick pulse generated by a kick pulse generator 56, are varied in response to a reproducing mode signal which is supplied to these switching pulse generator 52 and kick pulse generator 56 through a comparator and operational circuit 63. The polarity of the switching pulse is varied when the detection signal is generated by the fp3 detector 49 or when the kick pulse (excluding the kick pulse generated during a period in which the reference signal fp3 is reproduced) is generated by the kick pulse generator 56 and supplied to a tracking circuit 58 which will be described hereinafter. Thus, an envelope of the reference signal reproduced from the subtrack on the outer peripheral side of the disc with respect to the main track which is to be reproduced, is detected by the detector 54. On the other hand, an envelope of the reference signal reproduced from the subtrack on the inner peripheral side of the disc with respect to the main track which is to be reproduced, is detected by the detector 55. Envelope detection signals produced from these detectors 54 and 55, are supplied to a differential amplifier 57 provided in a subsequent stage. The differential amplifier 57 produces a tracking error signal having a polarity which is in accordance with the direction of the tracking error, and having a level which is in accordance with the quantity of the tracking error. This tracking error signal is converted into a predetermined driving voltage in the tracking circuit 58, and then applied to the tracking coils 39a and 39b within the signal pickup device 23. As a result, the stylus tip of the reproducing stylus 36 is displaced in a radial direction of the disc 20 with a quantity so as to correct the tracking error.

An adapter 59 comprises an operation switch 60 and a memory 61. The operation switch 60 comprises switches for selecting an arbitrary program from among the five different programs A through E described before. An output signal of the operation switch 60 is supplied to the memory 61 so as to read out an address signal indicating a program number which corresponds to the selected program. The address signal read out from the memory 61 is supplied to a memory 62. The memory 62 stores the address signal from the memory 61, and supplies this address signal to the comparator and operational circuit 63.

On the other hand, the signal demodulated in the demodulating circuit 48 is supplied to a video signal processing circuit (not shown) provided in a stage subsequent to an output terminal 64. The output signal of the demodulating circuit 48 is also supplied to FM demodulators 65 and 66 and an address reproducing circuit 67. The address reproducing circuit 67 reproduces the address signal including the program number code, which is multiplexed and recorded in a predetermined 1H within the vertical blanking period of the video signal, and counts the number of vertical synchronizing signals reproduced after the detection signal is supplied to this address reproducing circuit 67 from the fp3 detector 49.

The comparator and operational circuit 63 compares and calculates a difference between a program number N (N is an integer) obtained from the memory 62 and a program number M (M is an integer) of the program which is being reproduced and obtained from the address reproducing circuit 67. When the difference between the program numbers N and M is zero, the comparator and operational circuit 63 produces a control pulse with a timing and polarity instructed by the kick instruction code and the kicking direction instruction code within the reproduced address signal, and supplies this control signal to the switching pulse generator 52 and the kick pulse generator 56. Accordingly, the polarity of the switching pulse is reversed with every incoming control pulse, and a kick pulse for kicking the reproducing stylus towards the inner peripheral direction of the disc or a kick pulse for kicking the reproducing stylus towards the outer peripheral direction of the disc is generated according to the polarity and timing of the control pulse. As a result, the reproducing stylus 36 moves along a scanning locus which is in accordance with the instructions of the kick instruction code and the kicking direction instruction code, and reproduces the selected program under the normal reproduction mode.

Figure 13:
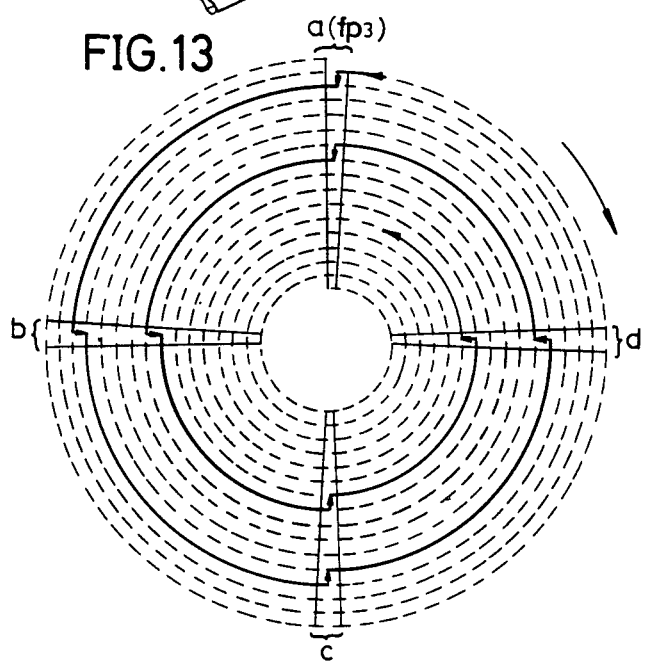
FIG. 13 shows a scanning locus of the reproducing stylus when reproducing signals from the disc having the track pattern shown in FIG. 8 under a normal reproduction mode.

Accordingly, when the disc 20 is a disc recorded with the five programs A through E indicated along the vertical axis in FIG. 5, the reproducing stylus 36 moves along a scanning locus indicated by a bold line in FIG. 13. This scanning locus is the same as the scanning locus with respect to a conventional disc when carrying out a quintuple-speed reproduction. The kick pulse is generated so that the reproducing stylus 36 is kicked towards the inner peripheral direction of the disc every time the recording parts a, b, c, and d of the vertical blanking periods in one track turn are reproduced, as shown in FIG. 13. Moreover, the switching pulse is generated in synchronism with the kick pulse so as to reverse the tracking polarity at the three recording parts b, c, and d of the vertical blanking periods excluding the recording part a of the vertical blanking period in which the reference signal fp3 is recorded. Because one field of each of the five programs is recorded in succession on the disc having the track pattern shown in FIG. 8, when the reproducing stylus 36 moves along the scanning locus shown in FIG. 13, the video and audio signals related to one program among the five programs A through E are reproduced under the normal reproduction mode.

The operation switch 60 sets one recording part among the recording parts a, b, c, and d of the vertical blanking periods from which the scanning locus shown in FIG. 13 is to be started, and an arbitrary program among the programs A through E is reproduced by this setting.

Normally, when z (z is an integer) programs are recorded on the disc, each of the information signals in one field period recorded in alignment along the radial direction of the disc on z mutually adjacent tracks, are information signals from among which one information signal is to be arbitrarily switched and reproduced at one time. For example, in the disc having the program recording arrangement shown along the vertical axis in FIG. 5, the information signals A5, B4, C3, D2, and E1, and the information signals A9, B8, C7, D6, and E5 are such information signals recorded in alignment along the radial direction of the disc on the five mutually adjacent tracks. Thus, in this disc, one information signal among the information signals A5, B4, C3, D2, and E1 is reproduced at one time, and one information signal among the information signals A9, B8, C7, D6, and E5 is reproduced at one time. Similarly, when the disc has the program recording arrangement shown along the vertical axis in FIG. 6, the information signals A3, B2, and C1 and the information signals A7, B6, and C5 are respectively recorded in alignment along the radial direction of the disc on the three adjacent tracks, and one information signal among these information signals A3, B2, and C1 is reproduced at one time and one information signal among the information signals A7, B6, and C5 is reproduced at one time.

In addition, in FIG. 12, the comparator and operational circuit 63 and the kick pulse generator 56 may be constituted by a microcomputer 72 which will be described hereinafter.

During the normal reproduction mode, the reproducing stylus 36 is forcibly kicked from one track to another within the vertical blanking period of the video signal. Thus, the kicking of the reproducing stylus 36 does not introduce undesirable effects with respect to the reproduced picture. However, the audio signals do not have a synchronizing signal, and are transmitted continuously. As a result, when kicking the reproducing stylus 36 from a first track to a second track, the recording part of the audio signal on the first track where the kick starts and the recording part of the audio signal on the second track where the kick terminates must accurately coincide. Otherwise, noise will become mixed into the reproduced sound. That is, the kicking positions where the reproducing stylus 36 is kicked, are also program-connecting recording positions where the different programs connect. For example, the reproducing stylus 36 may be kicked at a program-connecting recording position between a program related to an explosion scene and a program related to a quiet scene. In this case, if the program-connecting recording positions along the kicking direction do not accurately coincide with respect to the first track before the kick and the second track after the kick, the position where the kick is terminated may intrude within the program related to the explosion scene even when the program related to the quiet scene is to be reproduced continuously by carrying out this kick. Thus, in such a case, the explosion sound of the program related to the explosion scene will be mixed within the reproduced sound of the program related to the quiet scene as noise.

Hence, according to the present invention, the audio signals of a plurality of channels in the vicinity of the program-connecting recording positions where the different programs switch over and connect are recorded so that the program-connecting recording position of the audio signal related to one channel and the program-connecting recording position of the audio signal related to the other channel are mutually in non-alignment along the track scanning direction as shown in FIG. 8, in order to eliminate the above problem of noise introduced with the kick. Further, when reproducing the signals from the disc recorded in this manner, switching is performed when the kick is carried out in order to reproduce the audio signal of one channel which is not the channel from which the audio signal was reproduced up to the point when the kick was carried out.

That is, the FM demodulators 65 and 66 shown in FIG. 12 respectively frequency-demodulate the FM audio signals having the frequency spectrums indicated by $AU_1$ and $AU_2$ in FIG. 2, by the demodulating signal having the frequency spectrum shown in FIG. 2 which is obtained from the demodulating circuit 48. Accordingly, the reproduced audio signal of the first channel is obtained from the FM demodulator 65 and supplied to a terminal 68a of a switching circuit 68. At the same time, the reproduced audio signal of the second channel is obtained from the FM demodulator 66 and supplied to a terminal 68b of the switching circuit 68.

Figure 14:
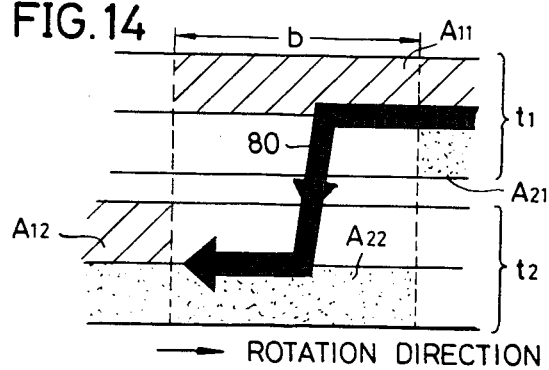
FIG. 14 schematically shows tracks in the vicinity of a position where the reproducing stylus is kicked from one track to another track and a scanning locus of the reproducing stylus.

The stylus tip of the reproducing stylus 36 is kicked within the recording part of the vertical blanking period, immediately after the vertical synchronizing signal is reproduced. FIG. 14 shows the scanning locus of the tip end of the reproducing stylus 36 before and after the kick, and the two mutually adjacent tracks are indicated by t1 and t2. As shown in FIG. 14, it is assumed that the reproducing stylus 36 is kicked from the track t1 to the track t2, within the recording part b of the vertical blanking period, and that the reproducing stylus 36 moves along a scanning locus 80. Immediately before the kick on the track t1, the audio signal related to the first program A only exists in the recording interval $A_{11}$ of the first channel within the recording part b of the vertical blanking period. On the other hand, immediately after the kick on the adjacent track t2, the audio signal related to the first program A only exists in the recording interval $A_{22}$ of the second channel within the recording part b of the vertical blanking period.

Thus, the kick pulse generated from the kick pulse generator 56 shown in FIG. 12 is supplied to a monostable multivibrator 69 wherein the kick pulse is converted into a pulse having a pulse width such that the pulse assumes high level during a predetermined interval which is in the order of ½ field period, for example. The output pulse of the monostable multivibrator 69 is supplied to the switching circuit 68 as a switching pulse. The switching circuit 68 is designed to select and produce the input signal applied to its terminal 68b during the high level period of the pulse from the monostable multivibrator 69, and to produce the input signal applied to its terminal 68a during the low level period of the pulse from the monostable multivibrator 69. Accordingly, during a predetermined interval in the order of ½ field period from the point in time when the kick pulse is generated, the reproduced audio signal of the second channel which is obtained from the FM demodulator 66 is produced from the switching circuit 68. After this predetermined interval, the switching circuit 68 produces the reproduced audio signal of the first channel which is obtained from the FM demodulator 65. The reproduced audio signal thus selected and produced from the switching circuit 68, is passed through an amplifier 70 and produced through an output terminal 71.

Therefore, when the reproducing stylus 36 moves along the scanning locus 80 so as to reproduce the first program A under the normal reproduction mode, the switching circuit 68 is switched so that the audio signal of the first channel which is reproduced from the recording interval $A_{11}$ of the track t1 is obtained at the output of the switching circuit 68 immediately before the kick, and the audio signal of the second channel which is reproduced from the recording interval $A_{22}$ of the track t2 is obtained at the output of the switching circuit 68 when the reproducing stylus 36 is kicked. The audio signal of the second channel which is reproduced from the recording interval $A_{22}$ is obtained at the output of the switching circuit 68 until the predetermined interval described before elapses. After this predetermined interval from the kick, the switching circuit 68 is switched so that the audio signal of the first channel which is reproduced from the recording interval $A_{12}$ of the track t2 is obtained at the output of the switching circuit 68. Hence, according to the present embodiment, it is possible to prevent the generation of noise which would become mixed into the reproduced audio signal if the program-connecting recording positions of the 2-channel audio signals do not accurately coincide at the kicking position. As a result, it is possible to obtain a reproduced audio signal in which no noise is mixed at the kicking positions.

It was explained heretofore that one program among the five programs A through E is reproduced under the normal reproduction mode when the reproducing stylus 36 moves along the scanning locus shown in FIG. 13. The program reproducing time during this normal reproduction mode is shown in FIG. 5. In FIG. 5, a thin solid line indicates the transition in the reproducing time of the program A, a broken line indicates the transition in the reproducing time of the program B, a bold solid line indicates the transition in the reproducing time of the program C, a double solid line indicates the transition in the reproducing time of the program D, and a one-dot chain line indicates the transition time in the reproducing time of the program E.

Figure 15:
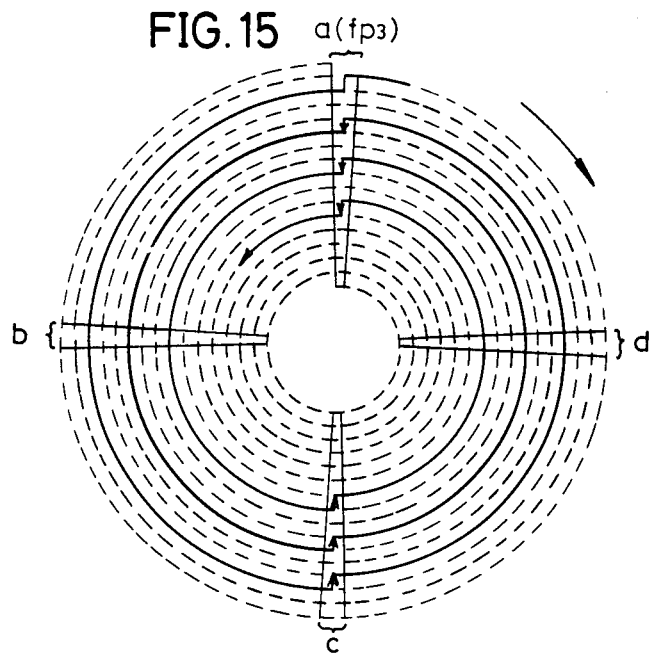
FIG. 15 shows a scanning locus of the reproducing stylus when reproducing signals from the disc having the recording arrangement shown in FIG. 6 under a normal reproduction mode.

A program can be reproduced similarly under the normal reproduction mode from the second embodiment of the disc having the program recording arrangement indicated along the vertical axis in FIG. 6. With respect to this second embodiment of the disc, the reproducing stylus 36 is kicked towards the inner peripheral direction of the disc after reproducing two fields, that is, at the recording parts a and c of the vertical blanking periods as indicated by a solid line in FIG. 15 when carrying out the normal reproduction. The scanning locus of the reproducing stylus 36 indicated by the solid line in FIG. 15 is the same as the scanning locus with respect to a conventional disc when carrying out a triple-speed reproduction. When the reproducing stylus 36 moves along the scanning locus indicated by the solid line in FIG. 15, the video and audio signals related to an arbitrary program among the three programs A through C are reproduced under the normal reproduction mode. The program reproducing time is indicated along the horizontal axis in FIG. 6. In FIG. 6, a solid line indicates the transition in the reproducing time of the program A, a broken line indicates the transition in the reproducing time of the program B, and a double solid line indicates the transition in the reproducing time of the program C.

The signals are reproduced similarly from the third embodiment of the disc having the program recording arrangement indicated along the vertical axis in FIG. 7. In this case, the reproducing stylus 36 is kicked towards the inner peripheral direction of the disc after reproducing four fields. Thus, the video and audio signals related to one of the programs A and B are reproduced under the normal reproduction mode. The program reproducing time during this normal reproduction is shown in FIG. 7. In FIG. 7, a solid line indicates the transition in the reproducing time of the program A, and a broken line indicates the transition in the reproducing time of the program B.

Next, description will be given with respect to the operation performed, when the video and audio signals related to a program are being reproduced under the normal reproduction mode, and switching is carried out to instantaneously switch to a different program so as to reproduce the video and audio signals related to this different program under the normal reproduction mode. First, one method of going about this instantaneous switching of programs being reproduced, is as follows. That is, according to one method, the kick is suspended at the position where the kick is to be originally performed while one program is being reproduced under the normal reproduction mode, and the kick is performed thereafter in the original sequence from the subsequent recording position of the vertical blanking period where the kick is to be performed so as to reproduce a different program under the normal reproduction mode. For example, when reproducing the signals from the disc having the program recording arrangement shown in FIG. 5, the kicking of the reproducing stylus 36 is suspended at a position indicated by a circular mark in FIG. 5. This position where the kick is suspended, corresponds to the recording part b of the vertical blanking period immediately after the information signal A5 related to the fifth field program A is reproduced. When the kick is suspended at this position indicated by the circular mark in FIG. 5, the reproducing stylus 36 starts to reproduce the information signal B5 related to the fifth field of the program B, which is recorded subsequent to the information signal A5. The kick pulse is generated in the original sequence from the recording part c of the vertical blanking period immediately after the information signal B5 is reproduced, so that the reproducing stylus 36 moves along the scanning locus shown in FIG. 13 to reproduce the program B. Thus, the information signals of the program B are reproduced in a sequence B6→B7→B8→B9→ . . . As a result, the program being reproduced under the normal reproduction mode is instantaneously switched at the position indicated by the circular mark in FIG. 5 where the kick is suspended, from the program A to the program B, so that the information signal B5 of the program B is reproduced under the normal reproduction mode.

In addition, as another method of instantaneously switching the program being reproduced, a number of kick pulses corresponding to the difference (N−M) may be generated, where M is the program number of the program which is being reproduced and N is the program number of a different program which is to be reproduced after the instantaneous switching of the programs. In this case, the address reproducing circuit 67 reproduces the kick address signal described previously, and supplies the value of the program number code within the reproduced kick address signal to the comparator and operational circuit 63, as the program number M of the program which is being reproduced.

Figure 16:
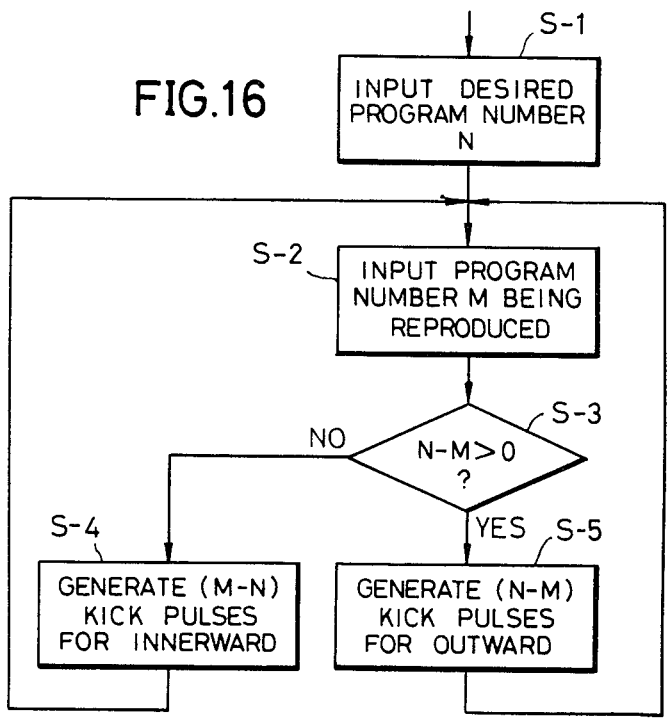
FIG. 16 is a flow chart for explaining the operation of a microcomputer within the reproducing apparatus according to the present invention.

In addition, when the comparator and operational circuit 63 and the kick pulse generator 56 are constituted by the microcomputer 72, the operations shown in FIG. 16 are performed by the microcomputer 72. In FIG. 16, when the operator manipulates the operation switch 60 and sets the desired program number N which is to be reproduced after the instantaneous switching of the programs, the microcomputer 72 performs a step S-1 to input and discriminate the incoming desired program number N obtained through the memories 61 and 62. A step S-2 is performed to input and discriminate the program number M of the program which is being reproduced, which is obtained from the address reproducing circuit 67. At a step S-3, the difference (N−M) between the program numbers N and M is calculated, and discrimination is made to determine whether the difference (N−M) is greater than zero. If the discrimination result at the step S-3 is "NO", that is, when the program number M is greater than the program number N, (M−N) kick pulses are generated at a step S-4 for kicking the reproducing stylus 36 towards the inner peripheral direction of the disc. On the other hand, if the discrimination result at the step S-3 is "YES", that is, when the program number N is greater than the program number M, (N−M) kick pulses are generated at a step S-5 for kicking the reproducing stylus 36 towards the outer peripheral direction of the disc. Accordingly, the reproducing stylus 36 is moved by a quantity in accordance with the value of the difference (N−M), and moved in a direction in accordance with the polarity of the difference (N−M).

Figure 17:
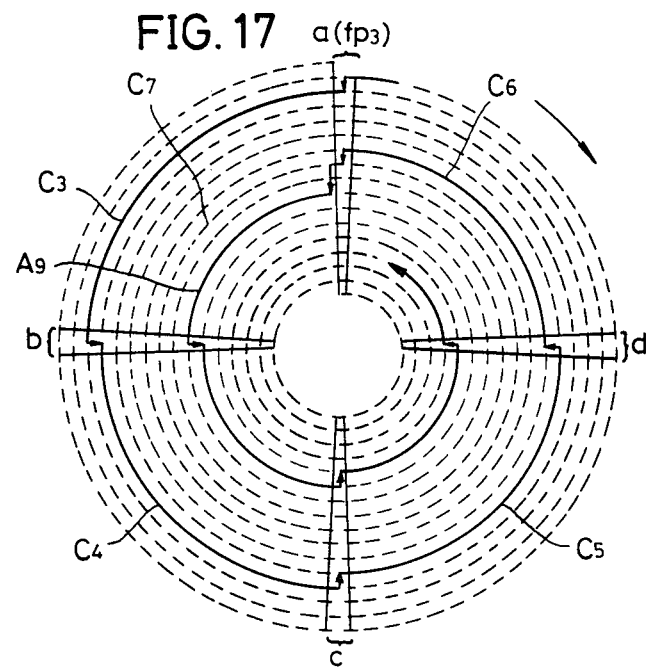
FIG. 17 shows an example of a scanning locus of the reproducing stylus when the program being reproduced is changed in the reproducing apparatus according to the present invention.

For example, the disc 20 may have the program recording arrangement indicated along the vertical axis in FIG. 5. That is, the five programs A through E may be recorded such that one field of each program is recorded in a sequence A→B→C→D→E→A→ . . . , from the outer periphery to the inner periphery of the disc. In this case, the program numbers assigned to the programs A through E are "0", "1", "2", "3", and "4" in this sequence, as described previously. Assume a case where the program C of such a disc is being reproduced under the normal reproduction mode. When the operation switch 60 is manipulated when the information signal C6 of one field is being reproduced so as to switch and reproduce the program A, the microcomputer 72 discriminates that the program number M of the program which is being reproduced is "2" (that is, the program is the program C) at the point when the kick address signal recorded within the recording part a of the vertical blanking period is reproduced. This corresponds to the step S-2 in FIG. 16. Because it is discriminated at the preceding step S-1 that the desired program which is to be reproduced after the switching of the program is the program A, and that the desired program number N is "0", the difference (N−M) can be calculated at the step S-3. In this case, a difference of "−2" is calculated at the step S-3, and two kick pulses for kicking the reproducing stylus 36 towards the inner peripheral direction of the disc are generated at the step S-4. As a result, the reproducing stylus 36 is kicked towards the inner peripheral direction of the disc by a quantity of two track pitches after reproducing the information signal C6, and starts to reproduce the information signal A9 of one field related to the program A, as indicated by the solid line in FIG. 17. The program A is reproduced according to the scanning locus shown in FIG. 13. Accordingly, the instantaneous switching of programs is performed, to instantaneously start reproducing the program A from the state in which the program C was being reproduced.

In addition, the instantaneous switching of programs may be performed to instantaneously start reproducing the program E from the state in which the program B was being reproduced, for example. In this case, the difference (N−M) becomes equal to "3". Thus, the reproducing stylus 36 is kicked towards the outer peripheral direction of the disc by three track pitches. The switching may be similarly performed between other programs.

Figure 18:
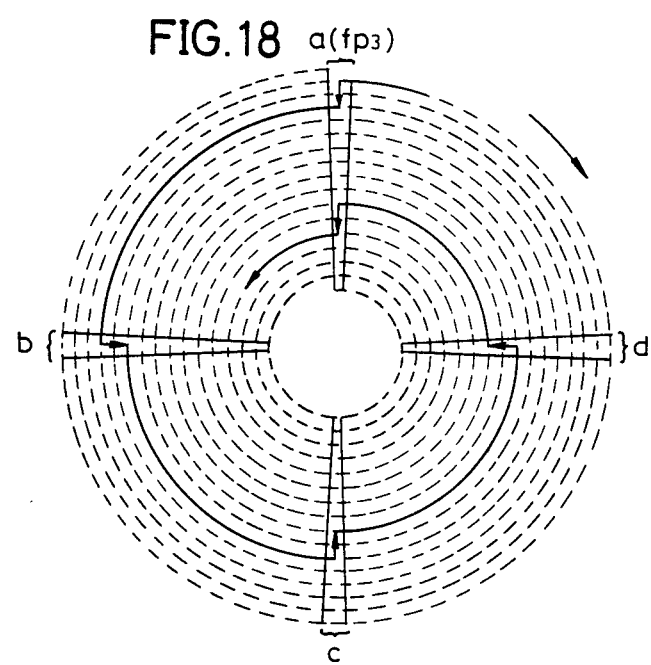
FIG. 18 shows a scanning locus of the reproducing stylus when reproducing signals from another embodiment of a disc according to the present invention under a normal reproduction mode.

If the reproducing stylus 36 is kicked by a quantity of two or more track pitches during the normal reproduction mode, it becomes possible to distribute and record six or more programs. For example, the reproducing stylus 36 may be kicked by two track pitches at each of the recording parts a, b, c, and d of the vertical blanking periods, so as to move along a scanning locus shown in FIG. 18. In this case, nine programs can be recorded on the disc by recording one field of each of the nine programs in succession, and repeating this recording sequence.

Therefore, if a maximum number of programs which may be recorded on the disc which is recorded with four fields of the video signal in one track turn is designated by K, this maximum K can be described by the following equation (1).

$$K = (4/n) + 1 \qquad (1)$$

In the equation (1), n is the number of fields reproduced between one kicking position and a subsequent kicking position on the disc, and the value 4/n is an integer. Accordingly, n assumes a value such as 1, 2, 4, 0.8, 0.5, 0.4, 0.25, and 0.2.

Description was given heretofore with respect to cases where the present invention is applied to the disc previously proposed in the patent and patent application in which the assignee is the same as the assignee of the present application, however, the present invention is not limited to the application to this previously proposed disc. For example, the disc may be recorded with two fields of the video signal in one track turn. Further, the disc may be an optical type disc. In the optical type disc, a laser light is projected onto the disc upon reproduction, and the recorded signals are read by detecting variation in the intensity of light reflected from or transmitted through the disc. The present invention can be applied to these discs, and embodiments of program recording arrangements in which two fields of the video signal are recorded in one track turn, are shown in FIGS. 19(A), 19(B), and 20.

Figure 19:
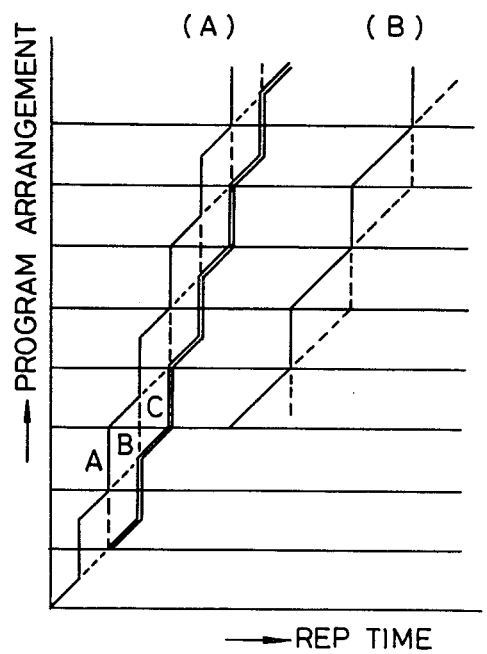
FIGS. 19(A) and 19(B) schematically show program recording arrangements and reproducing times of another embodiment of a disc according to the present invention.

In the embodiment shown in FIG. 19(A), the disc is recorded with two fields of the video signal in one track turn, and three programs A through C are recorded. One field of each of the three programs is distributed and recorded in succession, and this recording sequence is repeated. Thus, one field of the program A and one field of the program B are recorded in succession in a first track turn, one field of the program C and one field of the program A are recorded in succession in a subsequent second track turn, one field of the program B and one field of the program C are recorded in succession in a subsequent third track turn, and so on. In FIG. 19(A), a solid line indicates the transition in the reproducing time of the program A, a broken line indicates the transition in the reproducing time of the program B, and a double solid line indicates the transition in the reproducing time of the program C.

In the embodiment shown in FIG. 19(B), the disc is recorded with two fields of the video signal in one track turn, and two programs A and B are recorded. Thus, one field of the program A and one field of the program B are recorded in succession in one track turn, and this recording sequence is repeated for each track turn. In FIG. 19(B), a solid line indicates the transition in the reproducing time of the program A, and a broken line indicates the transition in the reproducing time of the program B.

Figure 20:
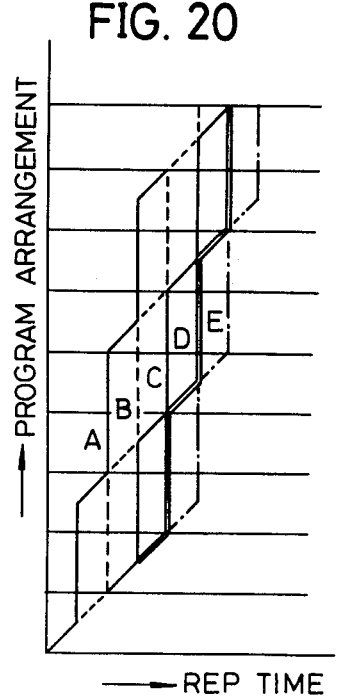
FIG. 20 schematically shows a program recording arrangement and reproducing time of still another embodiment of a disc according to the present invention.

Further, in the embodiment shown in FIG. 20, the disc is recorded with two fields of the video signal in one track turn, and five programs A through E are recorded. One field of each of the five programs is distributed and recorded in succession, and this recording sequence is repeated. Thus, one field of the program A and one field of the program B are recorded in succession in a first track turn, one field of the program C and one field of the program D are recorded in succession in a subsequent second track turn, one field of the program E and one field of the program A are recorded in succession in a subsequent third track turn, and so on. In FIG. 20, a thin solid line indicates the transition in the reproducing time of the program A, a broken line indicates the transition in the reproducing time of the program B, a bold solid line indicated the transition in the reproducing time of the program C, a double solid line indicates the transition in the reproducing time of the program D, and a one-dot chain line indicates the transition time in the reproducing time of the program E.

In the discs having the program recording arrangements shown in FIGS. 19(A) and 19(B), the reproducing stylus is kicked by one track pitch during the normal reproduction mode. On the other hand, in the disc having the program recording arrangement shown in FIG. 20, the reproducing stylus is kicked by two track pitches during the normal reproduction mode.

Figure 21:
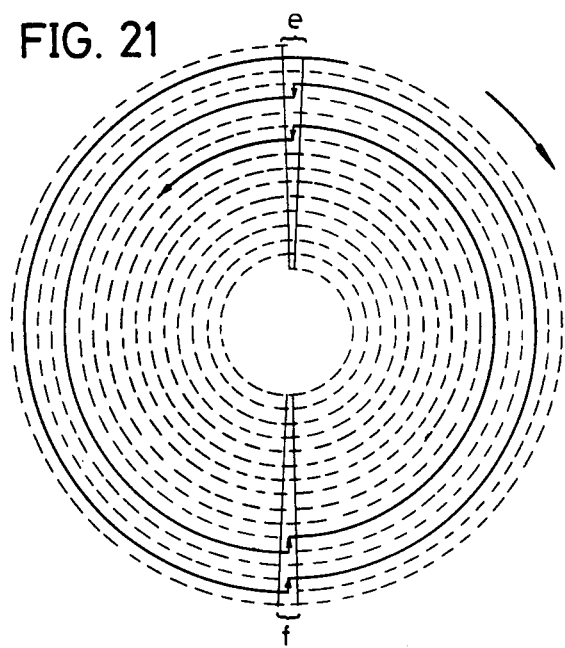
FIG. 21 shows an embodiment of a scanning locus of the reproducing stylus when reproducing signals from a disc according to the present invention which is recorded with an information signal at a rate of two fields in one track turn, under a normal reproduction mode.

In FIG. 21, a solid line indicates a scanning locus of the reproducing stylus when the signals are reproduced from the disc having the program recording arrangement shown in FIG. 19(A) under the normal reproduction mode. One arbitrary program among the three programs A through C is reproduced under the normal reproduction mode when the reproducing stylus moves along the scanning locus shown in FIG. 21. A different program is reproduced if the kick is suspended at the recording part e or f of the vertical blanking period where the reproducing stylus should originally be kicked. Thus, the instantaneous switching of the program to be reproduced is performed similarly as described before.

Therefore, if a maximum number of programs which may be recorded on the disc which is recorded with two fields of the video signal in one track turn is designated by L, this maximum L can be described by the following equation (2).

$$L = (2/n) + 1 \qquad (2)$$

In the equation (2), n is the number of fields reproduced between one kicking position and a subsequent kicking position on the disc as in the equation (1) described before, and the value 2/n is an integer. Thus n may assume a value such as 1, 2, and 0.5.

According to the present invention, switching can be performed instantaneously to switch the program which is to be reproduced. Hence, when the present invention is applied to a simulation game, for example, the game can be played in real time without the player losing interest.

Normally, the program recording arrangement of the disc according to the present invention is only used with respect to a part of the recording surface of the disc. For example, if the disc relates to a baseball simulation game, the pitching motion of the pitcher is common for all kinds of pitches. The player manipulates the operation switch 60 shown in FIG. 12 to select a kind of pitch such as a curve while monitoring the reproduced picture, and a picture showing the movement of the selected kind of pitch is reproduced by kicking the reproducing stylus according to this selected kind of pitch. Moreover, the disc according to the present invention is not limited to the application to games, and may be applied to audiovisual texts for teaching driving of automobiles and teaching piloting of airplanes, for example.

Further, the present invention is not limited to these embodiments, but various variations and modifications may be made without departing from the scope of the present invention.

What is claimed is:

1. A rotary recording medium comprising a spiral track made up of a plurality of consecutive track turns on which a television signal made up of a video signal and two channels of audio signals are recorded, there being television signals related to different programs, the television signals being segmented and recorded at a rate of X fields in each track turn, where X is an even integer equal to or greater than two, said medium to be played on a reproducing apparatus which has a reproducing element for reproducing the recorded television signal from said rotary recording medium, said rotary recording medium having:

Z programs successively switched over and recorded on said spiral track in a time-sequence, said recording being in terms of l fields, where: Z is a positive integer described by an equation $Z = (X/m) + 1$, m is an arbitrary number greater than zero, (X/m) is a positive integer, and $l = m$ when $m \geq 1$ and $l = 1$ when $m < 1$;

a plurality of program connecting positions occurring in said spiral track at the locations where the programs switch over and connect to each other, said two channels of audio signals in the television signal being related to one program and being substantially the same in the two channels; and a plurality of audio switchover positions where the audio signals in the television signal are related to different programs, said audio switchover positions being the locations where the audio signals switch over and connect to each other in each of said two channels, each of said audio switchover positions being located within a track part corresponding to a vertical blanking period of the video signal, each of said audio switchover positions of the audio signal of one channel being mutually in nonalignment along in a track scanning direction with respect to a corresponding one of said audio switchover positions of the audio signal of the other channel, so that the television signal related to one program is arbitrarily and selectively reproduced at one time from among said Z programs which are recorded over Z mutually adjacent track turns within the same angular range of said rotary recording medium.

2. A rotary recording medium as claimed in claim 1 further having an address signal recorded thereon, said address signal comprising a first code for indicating a program number assigned to each of said Z programs according to a recorded sequence of the programs, and a second code for identifying kicking positions where said reproducing element is to be forcibly kicked during reproduction to reproduce the recorded television signal under a normal reproduction mode and for indicating a kicking direction at each of said kicking positions, and said address signal is recorded on said spiral track responsive to an address signal supplied to an input terminal, a mixing circuit for mixing said address signal from said input terminal within at least one vertical blanking period of the video signal in one track turn, and recording means for recording an output of said mixing means on said spiral track.

* * * * *